Patented July 22, 1947

2,424,292

UNITED STATES PATENT OFFICE 2,424,292

ENDLESS PUSHER CONVEYER

Harmon L. Watkins and Baker M. Honeycutt, Shreveport, La.

Application April 12, 1945, Serial No. 587,932

2 Claims. (Cl. 198—173)

Our invention relates to endless conveyors.

An object of our invention is to provide an endless conveyor with universal anchoring means which will permit the conveyor both to assume positions resulting from changes in the vertical position of a barge or other boat and assume longitudinally adjusted positions incident to longitudinal movements of the barge or other boat that occur during the operation of unloading such barge or boat.

Another object of our invention is to provide an endless conveyor especially adapted for raising drums, barrels or other round objects by a method of rolling the objects up suitable guides forming a part of the conveyor to do away with all strain and wear on the conveyor chains themselves except as incident to the actual pushing force needed to roll the barrels or the like up the guides.

Another object of our invention is to provide an endless chain conveyor with tracks located on both its upper side and also its lower side positioned to support the weight of the entire length of the chains and chain attachments incorporated in our conveyor to make a compact conveyor and also to minimize the strains the chains are subject to under operating conditions.

Another object of our invention is to provide an endless conveyor designed to roll barrels or the like in upwardly slanting directions on guide rails forming a part of the conveyor and which may also be operated to slide flat cases or packages upwardly.

Another object of our invention is to provide in an endless conveyor a safety stop which will check the downward movement of an object being lifted by the conveyor if for any reason the driving mechanism of the conveyor becomes disengaged or broken in a manner to allow the object being lifted by the conveyor to roll or slide down the conveyor.

Other objects and advantages of our invention will appear in our detailed description to follow of the conveyor embodying our invention shown illustrated in our accompanying drawings.

Applicants are aware that endless conveyors are known to the art, but, as far as they are aware, none of the prior art conveyors are designed to roll barrels upwardly on guide rails or the like, nor are they provided with other features of novelty which applicants have mentioned above in their statement of objects of their invention.

Figure 1:
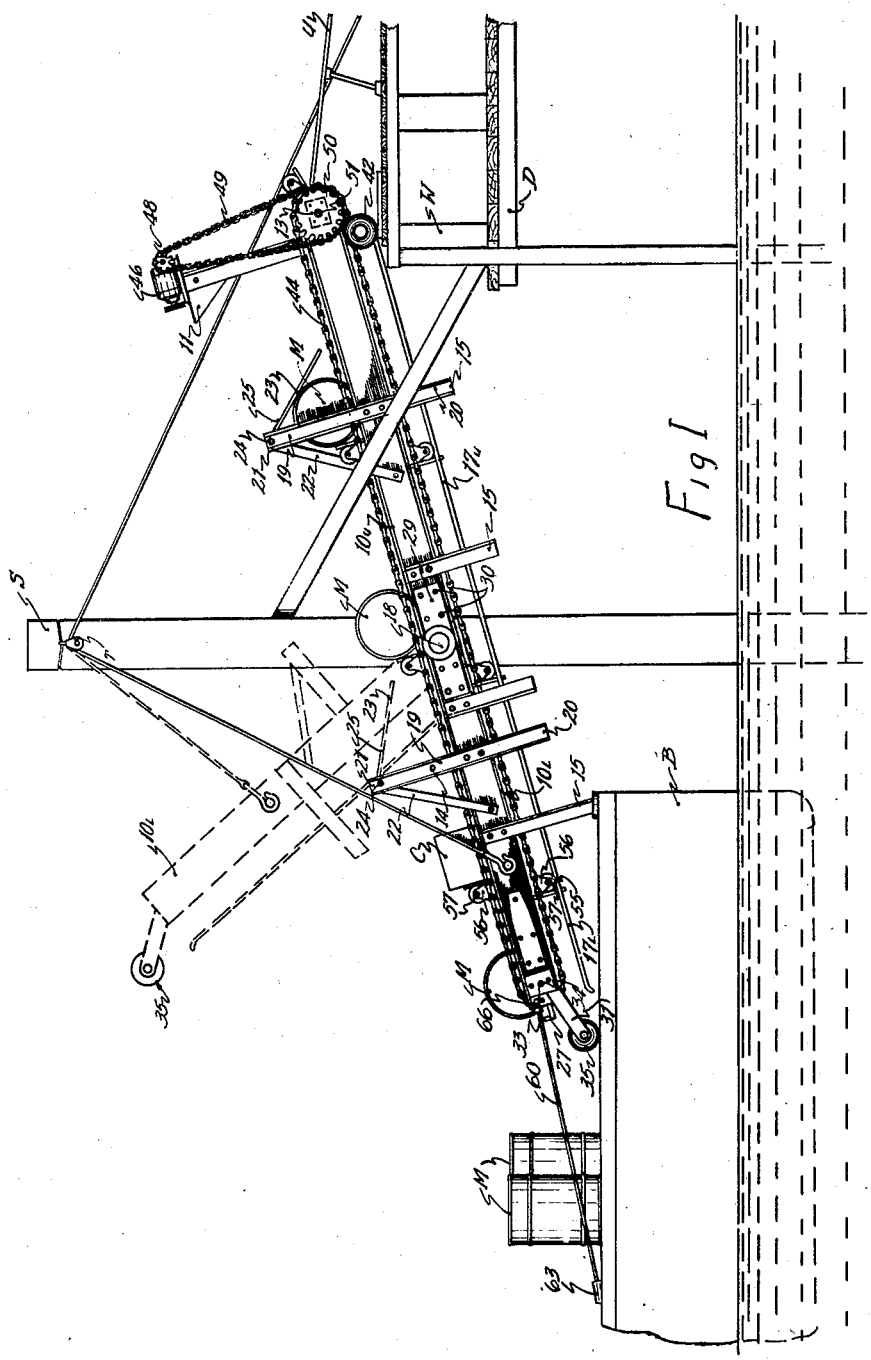
Figure 1 is a side elevation view of an endless conveyor embodying applicants' invention shown in an operating position with its lower end resting on a barge and its upper end resting on a dock platform.

Referring to the drawings, the frame portion of the endless conveyor is made up of a pair of channel shaped side plates made in upper sections $10_u$, on which the motor support $11$ is mounted and from which a pair of supporting feet $12$ depend, and the lower sections $10_l$ connected together by cross members $14$. Supporting legs $15$ are welded or otherwise attached to the side plates $10_u$ and $10_l$ respectively. The lower ends of the supporting legs $15$ are joined together by crosswise extending base members $16$.

Roller tracks made up of upper track sections $17_u$ and lower track sections $17_l$ are carried by the base members $16$. These tracks, upper sections $17_u$ and lower sections $17_l$, are used to support the weight of movable chain members of our conveyor, the uses of which will be explained in more detail further on in our description.

Two pairs of uprights $19$ are welded or otherwise attached to the side plates $10_u$ and $10_l$ and reinforced by angle braces $22$ connected to the upper ends $21$ of the uprights $19$ and upper side plates $10_u$ and lower side plates $10_l$. The leg portions $20$ of the uprights $19$ are joined together by base members $16$. The upper portions $21$ of the uprights $19$ serve as supports for the safety stops $23$ which are rotatably mounted in the upper end portions $21$ of the uprights $19$, by means of axle bars $24$ forming part of same. Each safety stop $23$ includes a pair of stop bars $25$ which extend at right angles to the axle bar $24$. The stop bars $25$ of each safety stop $23$ are made long enough to rest on the upper side of a cross member $14$ when the safety stop $23$ is in its stopping position. The further operation of these safety stops will be explained later on in connection with the operation of the illustrated endless conveyor.

A pair of spaced guide rails made in upper sections $26_u$ and lower sections $26_l$, which may be made out of pipe if desired, are welded or otherwise fastened to the top side of the cross members 14. The lower ends of these guide rails 26₁ are bent upwardly to form foot stops 27, the purpose of which will be explained later.

A floor plate made in an upper section 28u and a lower section 28₁ is welded or otherwise fastened to the cross members 14 in between the guide rails 26u and 26₁.

A pair of bearing lugs 13 is attached to and extends from the side plate upper sections 10u. The purposes of these bearing lugs will become apparent to the reader in the course of our description of the moving parts of our conveyor.

The bottom sections of the side plates 10₁ together with the lower sections of the guide rails 26₁ and the lower section of the floor plate 28₁ and the lower track section 17₁, all of which are joined together turn as a unit about hinge pins 18 on the upper sections 10u of the side plates with which the upper sections 26u of the guide rails, the upper section 28u of the floor plate and the upper sections 17u of the roller tracks are joined into a unit.

Before the lower section of the conveyor described above can be raised, the clamping plates 29 held in place by bolts 30, which clamping plates 29 span the abutting ends of the side plates 10u and 10₁, must be removed.

The principal purpose of the folding feature of our conveyor is to make it convenient to remove the part of it projecting over the body of water when the unloading operation of the barge B or other boat is completed. Maritime law demands that after a barge or boat has been unloaded everything in the nature of gangplanks and other unloading equipment be moved entirely back from over the surface of the water so that such equipment would no longer constitute a hazard to other barges and boats.

If necessary, the lower end of the upper section of our conveyor may be rested down on the lower platform of the dock D illustrated to bring the lower section farther inward from the edge of the water when the lower section is folded toward it by means of a block and tackle T hung from the overhead support S.

Another purpose of the folding feature of our conveyor is to make it more compact in shipping it on a truck or flat car from place to place. The reader should understand that due to the novel anchoring feature of our endless conveyor, which will be explained later, the conveyor as a whole may be lifted up or down by the block and tackle T, if desired. The reader should understand also that preferably the conveyor may be supported under one or more of the base members 16 whenever conditions provide suitable supporting foundation under the middle portion of the conveyor. The side plates 10u and 10₁ of the conveyor are made strong enough, however, to carry the load imposed upon them without benefit of a middle support.

We provide foot rollers at the lower ends of the lower sections 10₁ of the side plates for our endless conveyor to rest on the floor of a barge B or the like. The foot rollers 35 are rotatably mounted in roller casters 31 bolted to the lower sections 10₁ of the side plates. The roller casters 31 are provided with skid supporting bars 32 in their top surfaces and are provided with transversely extending chain axle bearings 33 and lift axle bearings 34, the use of which will become apparent in the latter part of our description.

Figure 3:
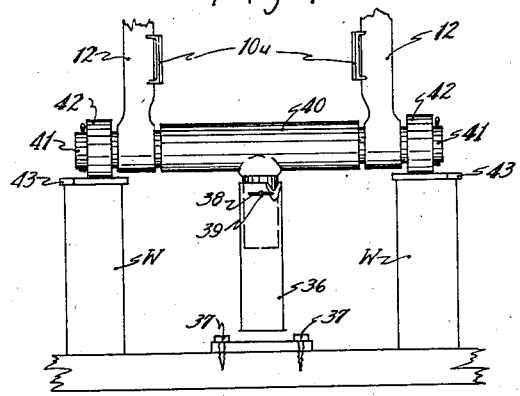
Figure 3 is an enlarged fragmentary view of a portion of the endless conveyor illustrated in Figure 1.

To best understand the anchoring feature of our endless conveyor, the reader's attention is directed to Figure 3 of the drawings. Our conveyor is anchored to a dock D or other loading platform by means of a hollow stanchion 36 which is secured to the dock floor preferably with lag bolts 37. The stanchion 36 is provided with oppositely positioned circular slots 38 through which a locking pin 39 extends. The locking pin 39 extends also through a T pipe fitting 40 which is rotatably mounted in the upper end of the hollow stanchion 36. The locking pin 39 and the slots 38 limit the horizontal rotary movement of the T fitting 40 and our endless conveyor which turns with the T fitting 40. The weight of the upper end of our endless conveyor is supported through means of a shaft 41 provided with rollers 42 rotatably mounted on its ends with the rollers 42 resting on metal plates 43. The shaft 41 also extends loosely through the T fitting 40 positioned in between the supporting feet 12 in which the shaft 41 is rigidly secured.

The metal plates 43 on which the rollers 42 rest are supported by wood constructions W built up to the proper height on the floor of the dock D or other unloading platform.

Due to the fact that the shaft 41 is rotatably mounted in the T fitting 40, the lower end of the conveyor resting on the barge B may be raised or lowered in vertical directions as shown by the dotted lines in Figure 1 of the drawings. The height of the barge floor will change as the load on the barge B changes. The height of the barge B itself with respect to the unloading dock D will change in accordance with a rise or fall of the water the barge B is floating in. Such changes may be due to tides or, in the case of streams, to the rise and fall due to rain and other causes.

Figure 2:
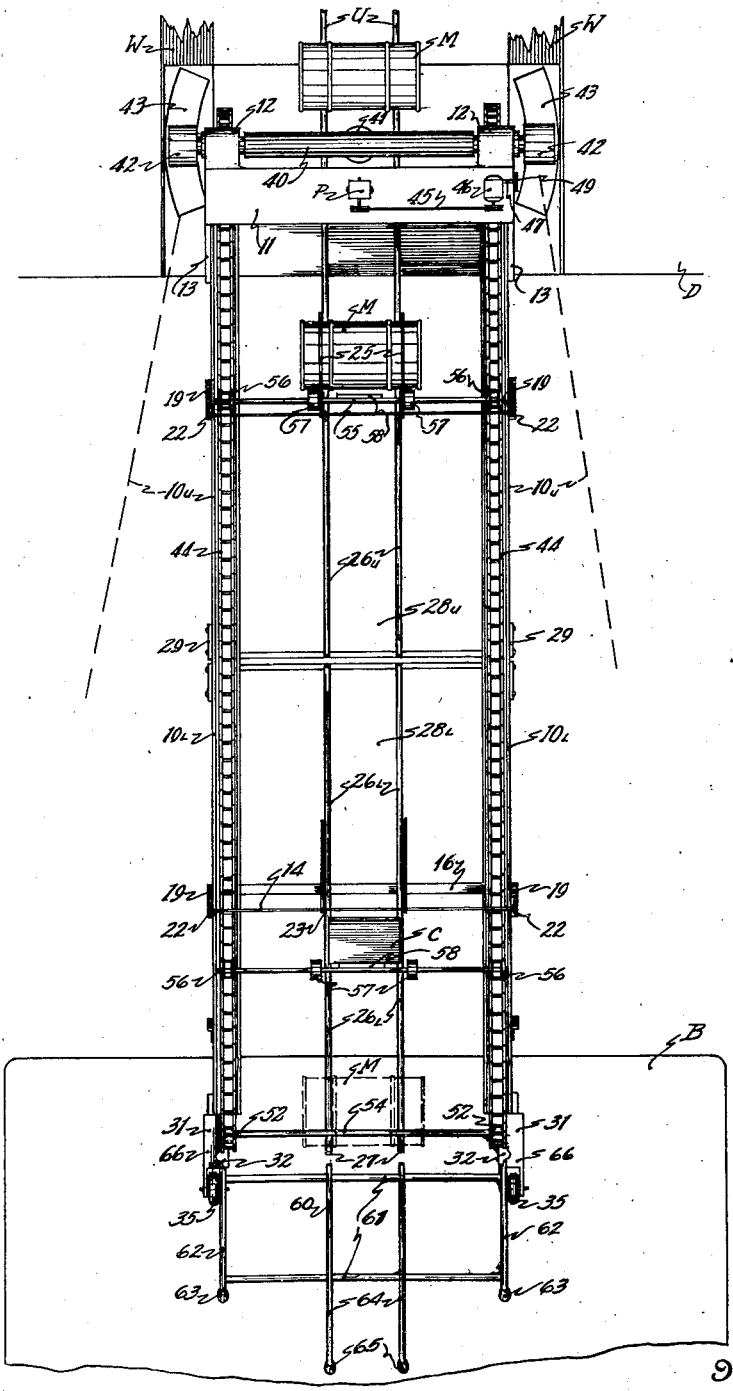
Figure 2 is a plan view of the endless conveyor illustrated in Figure 1.

Within the limits allowed by the locking pin 39 and the slots 38 through which it extends, the conveyor may swing from side to side, as shown by the dotted line positions in Figure 2 of the drawings. The rollers 42 will roll easily on the metal plates 43. When the barge B is moved to and from the bank of a stream or other body of water, the floor of the barge B merely moves under the foot rollers 35.

Our description thus far has been concerned mainly with the frame work of our endless conveyor and the means for anchoring the same to the dock D or the like.

Our endless conveyor is provided with a pair of endless conveyor chains 44 which loop completely around the abutting side plates 10u and 10₁. The upper faces of the side plates 10u and 10₁ function as tracks for the endless conveyor chains 44 to slide on in their upward travel of the conveyor in performing useful work. The entire weight of the chains 44 in their return trips down the under side of the conveyor is carried by a pair of spaced roller tracks made in upper roller track sections 17u and lower roller track sections 17₁. When the pushing rollers 57 travel down in these tracks 17u and 17₁, they hold up the conveyor chains 44 above the base members 16.

The endless conveyor chains 44 are driven by means of an electric motor P or other source of power mounted on the motor supporting frame 11 which is operatively connected to a reduction gear 46 by an endless driving belt 45. The reduction gear 46 includes a power take-off shaft 47 provided with a driving sprocket 48 on its outer end. The driving sprocket 48 is connected by an endless driving chain 49 to a driven sprocket 50 mounted on an end of the upper conveyor chain sprocket axle 51. The upper conveyor chain sprocket axle 51, which is rotatably mounted in the bearing lugs 13 bolted to the upper ends of the upper side plate sections 10u, carries a pair of conveyor chain sprockets 52 which are enmeshed with the right and left conveyor chains 44. The conveyor chains 44 are enmeshed with a duplicate pair of conveyor chain sprockets 52 mounted on the lower conveyor chain sprocket axle 54. The conveyor chain sprocket axle 54 is rotatably mounted in the chain axle bearings 33 in the foot roller casters 31. The pairs of conveyor chain sprockets 52 are positioned with respect to the side plates 10u and 10l to make use of the upper faces of the same to serve as supporting tracks for the conveyor chains 44 to slide on.

The conveyor chains 44 travel in unison, since they are joined together by means of pusher axles 55 which are positioned to travel above and below the side plates 10u and 10l by means of pusher axle supports 56 secured to the conveyor chains 44. Each pusher axle 55 carries a pair of rotatably mounted pushing rollers 57 and a pushing plate 58 positioned between the pushing rollers 57.

The pushing plate 58 is adapted to push a case C or other flat object up the floor plate sections 28l and 28u.

Figure 5:
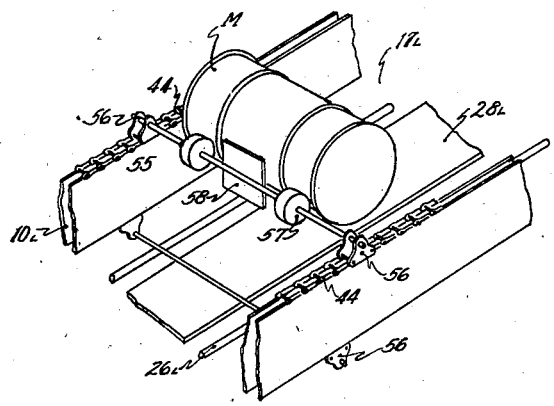

The pushing rollers 57 are adapted for rolling a round object such as a drum M up the guide rails 26l and 26u of our endless conveyor. The reader will see in the perspective view, Figure 5, how a drum M is rotated in a clockwise direction as it is being pushed upwardly on the conveyor. The pushing rollers 57, which are in contact with the drum M, are rotated in the reverse direction.

When the drum M is pushed under a safety stop 23, it lifts the safety stop 23 and passes under it. As soon as the drum M passes by the safety stop 23, the stop bars 25 fall down and rest on the cross member 14 in a safety position. If for any reason the drum M starts rolling back down the guide rails 26u and 26l, it will merely strike the stop bars 25 and come to rest. We have illustrated a machine equipped with two safety stops 23. The reader will understand that one stop 23 with a short conveyor would be sufficient and that a greater number than two safety stops 23 may be employed in long conveyors, if desired, within the scope of our invention.

When the drum M is rolled to the top of the conveyor, it is carried away on a pair of unloading rails U conveniently located. The unloading rails U form no part of our invention. The reader will appreciate that the drum M, barrels, or cases C lifted by our conveyor might be delivered to a floor surface in alignment with the upper end of our conveyor, if desired.

The reader's attention is now directed to Figure 1 and Figure 2 of the drawings in which he will see a removable loading skid 60 which constitutes a very useful part of our invention, but not an essential part of it. The purpose of the skid 60 is to make it easy for a crew to place a drum M on the guide rails 26l in a position so that it rests on the foot stops 27. The drum M stays in this position until a pair of pushing rollers 57 is brought into contact with the drum M. If the drum M is light, one or two of the crewmen might merely lift it up onto the guide rails 26l. If the case C is light enough, the crew may merely place it on the lower end of the floor plate 28l in a position to be contacted by a pushing plate 58 on a pusher axle 55. The loading skid 60 illustrated is made up of a pair of cross bars 61, a pair of side bars 62 terminating in flat feet 63, and a pair of center bars 64 terminating also in flat feet 65. Each of the side bars 62 is provided with an anchoring hook 66 adapted to hook over the skid supporting bars 32. The center bars 64 are spaced on the cross bars 61 so as to be aligned with the guide rails 26l when the skid 60 is anchored.

Figure 4:
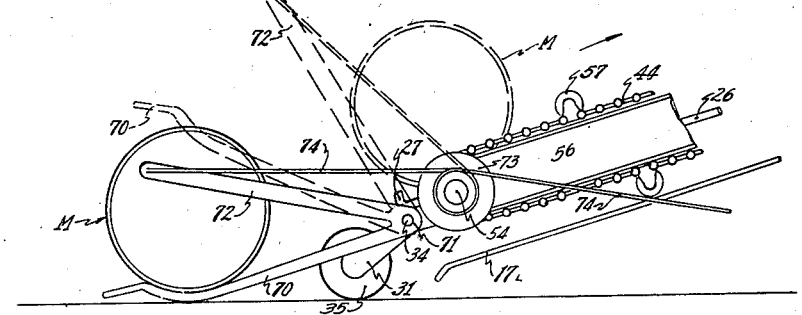
Figure 4 illustrates a modification of the lower end portion of the endless conveyor illustrated in Figure 1 and, Figure 5 is a diagrammatic view illustrating a mode of operation of the endless conveyor illustrated in Figure 1.

In Figure 4 of our drawings we have illustrated a loading device which may be used in place of the loading skid 60 above described. This loading device consists in a lifting rack comprising a pair of lifting arms 70 firmly attached to a common axle 71 which is rotatably mounted in the lift axle bearings 34; and an operating lever 72 welded to the axle 71 by which means the axle is turned. A cathead 73 is mounted on the right end of the lower conveyor chain axle 54 and adapted to rotate therewith. A rope 74 is attached to the end of the operating lever 72 and should be long enough to be wrapped around the cathead two or more times. Thus it can be seen that the lifting arms 70 may be made to move from a normal resting position on the floor of the barge B into a loading position as shown by the dotted lines.

A crew-man in operating this lifting device first rolls the drum M by hand onto the lifting arms 70. Then he pulls on the free end of the rope 74 wound several times around the cathead 73 to create sufficient friction to make the rope 74 wind up on the cathead 73. As the rope 74 winds up on the cathead 73, the lifting rack 70 is revolved upwardly toward the lower end of our endless chain conveyor to bring the drum M up with it to a point where the drum M will roll down onto the guide rails 26l above the foot stops 27. When the operator relaxes the rope 74, the lifting rack 70 falls down again onto the floor of the barge B or the like and the drum M rolls back a slight distance to its position of rest against the foot stops 27 where it waits to be pushed by a pair of pushing rollers 57 and to be rolled up on the guide rails 26l in the manner above described.

Various changes in the size and arrangement of the parts of the illustrated conveyor may be resorted to within the scope of our invention.

Since the manufacturing details of our conveyor present no problems to the mechanical arts with which it is related, no need is here seen to go into the details of its manufacture.

Having thus described our invention, we claim:

1. An endless chain conveyor comprising a frame, a pair of spaced parallel guide rails mounted on said frame on which a drum or the like is adapted to be rolled, a floor plate mounted between said guide rails on said frame on which a flat sided object is adapted to be slid, a pair of parallel endless chains rotatably mounted on said frame parallel to said guide rails, means for rotating said chains, said chains being joined together by one or more axles, each of said axles carrying a pair of pusher rollers positioned in vertical alignment with said guide rails, said pusher rollers being adapted to roll a drum or the like up said guide rails, each of said axles carrying a pusher plate positioned between said pusher rollers and adapted to slide a flat object up said floor plate.

2. The device as claimed in claim 1 including a pair of foot stops positioned at the lower ends of said guide rails adapted to hold a drum or the like placed on said guide rails in the path of said pusher rollers.

HARMON L. WATKINS.
BAKER M. HONEYCUTT.

REFERENCES CITED

The following references are of record in the file of this patent:

UNITED STATES PATENTS

| Number | Name | Date |
|---|---|---|
| 1,095,255 | Williams | May 5, 1914 |
| 1,247,388 | French | Nov. 20, 1917 |
| 1,382,557 | Schpatz | June 21, 1921 |
| 1,418,572 | Hoyt et al. | June 6, 1922 |
| 2,357,600 | Pabst | Sept. 5, 1944 |